(12) United States Patent
van den Hengel et al.

(10) Patent No.: US 9,185,355 B2
(45) Date of Patent: *Nov. 10, 2015

(54) NETWORK SURVEILLANCE SYSTEM

(71) Applicant: Adelaide Research & Innovation Pty Ltd, Adelaide, South Australia (AU)

(72) Inventors: Anton John van den Hengel, Adelaide (AU); Anthony Robert Dick, Adelaide (AU); Michael John Brooks, Adelaide (AU)

(73) Assignee: Snap Network Surveillance Pty Limited, Sourth Australia (AU)

(*) Notice: Subject to any disclaimer, the term of this patent is extended or adjusted under 35 U.S.C. 154(b) by 142 days.

This patent is subject to a terminal disclaimer.

(21) Appl. No.: 13/796,271

(22) Filed: Mar. 12, 2013

(65) Prior Publication Data

US 2013/0242109 A1    Sep. 19, 2013

Related U.S. Application Data

(63) Continuation of application No. 12/515,502, filed as application No. PCT/AU2007/001782 on Nov. 20, 2007, now Pat. No. 8,396,250.

(30) Foreign Application Priority Data

Nov. 20, 2006 (AU) ................. 2006906433

(51) Int. Cl.
*G06K 9/00* (2006.01)
*H04N 7/18* (2006.01)
*G08B 13/196* (2006.01)

(52) U.S. Cl.
CPC ............ *H04N 7/18* (2013.01); *G08B 13/19645* (2013.01); *G08B 13/19656* (2013.01)

(58) Field of Classification Search
None
See application file for complete search history.

(56) References Cited

U.S. PATENT DOCUMENTS

| | | | |
|---|---|---|---|
| 5,179,441 A | 1/1993 | Anderson et al. | |
| 6,192,156 B1 | 2/2001 | Moorby | |
| 6,295,367 B1 | 9/2001 | Crabtree et al. | |
| 7,068,842 B2 | 6/2006 | Liang et al. | |
| 2005/0058321 A1 | 3/2005 | Buehler | |
| 2005/0073585 A1 | 4/2005 | Ettinger et al. | |

(Continued)

FOREIGN PATENT DOCUMENTS

| | | |
|---|---|---|
| JP | 06-251159 A | 9/1994 |
| JP | 2003-279315 A | 2/2003 |
| JP | 2007505572 A | 3/2007 |

OTHER PUBLICATIONS

Brand, M. et al., "Spectral Solution of Large-Scale Extrinsic Camera Calibration as a Graph Embedding Problem", LNCS, 2004, pp. 262-273, vol. 3022.

(Continued)

*Primary Examiner* — Atiba O Fitzpatrick
(74) *Attorney, Agent, or Firm* — The Webb Law Firm

(57) ABSTRACT

A method for estimating the activity topology of a set of sensed data windows is described. Each of the sensed data windows related to a corresponding sensed region. The method includes the steps of determining a subset of sensed data windows that are not connected; and excluding the subset of sensed data windows from the set of sensed data windows. In one embodiment, the sensed data windows corresponding to image windows such as would be provided by a visual surveillance system.

20 Claims, 5 Drawing Sheets

(56) References Cited

U.S. PATENT DOCUMENTS

2005/0265582 A1 12/2005 Buehler et al.
2008/0077510 A1* 3/2008 Dielemans ...................... 705/28

OTHER PUBLICATIONS

Dick, A.R. et al., "A Stochastic Approach to Tracking Objects Across Multiple Cameras", LNA1, 2004, pp. 160-170, vol. 3339.
Ellis, T.J. et al., "Learning a Multi-Camera Topology", 7 pages, Digital Imaging Research Centre, Kingston University, UK, 2003.
Gilbert, A. et al., "Tracking Objects Across Cameras by Incrementally Learning Inter-Camera Colour Calibration and Patterns of Activity", LNCS, 2006, pp. 125-136, vol. 3952.
Javed, O. et al., "Tracking Across Multiple Cameras with Disjoint Views", Proceedings of the Ninth IEEE International Conference on Computer Vision, IEEE Computer Society, 2003, pp. 1-6.
Rahimi, A. et al., "Simultaneous Calibration and Tracking with a Network of Non-Overlapping Sensors", Proceedings of the 2004 IEEE Computer Society Conference on Computer Vision and Pattern Recognition, IEEE Computer Society, 2004, 8 pages.
Rahimi, A. et al., "Tracking People with a Sparse Network of Bearing Sensors", LNCS, 2004, pp. 507-518, vol. 3024.
Stauffer, C., "Learning to Track Objects Through Unobserved Regions", Proceedings of the IEEE Workshop on Motion and Video Computing, IEEE Computer Society, 2005, 7 pages.
Tieu, K. et al., "Inference of Non-Overlapping Camera Network Topology by Measuring Statistical Dependence", Proceedings of the Tenth IEEE International Conference on Computer Vision, IEEE Computer Society, 2005, pp. 1-8.

* cited by examiner

NETWORK SURVEILLANCE SYSTEM

CLAIM OF PRIORITY

The present application for patent is a continuation of U.S. application Ser. No. 12/515,502, filed May 19, 2009, now U.S. Pat. No. 8,396,250, which is the United States national phase of International Application No. PCT/AU2007/001782, filed Nov. 20, 2007, which claims the benefit of Australian Provisional Patent Application No. 2006906433, filed Nov. 20, 2006. The disclosure of each of these documents is hereby incorporated in its entirety by reference.

TECHNICAL FIELD

The present invention relates to surveillance systems. In a particular form, the present invention relates to surveillance systems that involve networks of multiple sensors distributed over an extended area.

BACKGROUND

With the increased focus on the surveillance of both private and public areas, there has been a substantial increase in the numbers and sophistication of cameras and sensors that are utilized to monitor these extended areas. An example of such a surveillance task is the monitoring of an airport or train station which may involve many hundreds of cameras each potentially providing a live feed to a centralized monitoring station where they are viewed by human operators. The operators may have a number of possible goals, such as observing customer behaviour, or identifying threats to the public or infrastructure.

This ability to employ multiple cameras has been facilitated by the use of real time digital video cameras which transfer their live image information via standard network protocols such as Internet Protocol (IP), thereby making the addition of further cameras to a pre-existing network as easy as connecting an IP camera to a central hub whether by wireless means or directly by cable. The IP camera is then provided either with a dynamic or static allocated IP address and can commence streaming of live video data in an extremely short time.

However, whilst this ease of being able to increase the number of cameras in a network surveillance system implies that more extended areas may be monitored at increased resolution, the large amount of incoming video information that is streamed to a centralized monitoring station quickly results in information overload when this information is being viewed by human operators. Accordingly, security personnel that are tasked to monitor this information are not able to effectively monitor these extended areas.

To address these shortcomings of large scale network surveillance systems, data analysis methods have been developed which attempt to analyse the incoming video information to determine if the behaviour of objects or people being viewed varies from "normal." This is with a view to presenting monitoring personnel with video information of those behaviours which have been initially classified as abnormal. To this end, these systems, which may be a combination of hardware and software, attempt to generate an understanding of the paths or tracks which "targets" may take between the fields of views of each of the cameras.

This "activity topology" information is accordingly the foundation for many fundamental tasks in networked surveillance, such as tracking an object across the network. In order to derive the activity topology of a network of cameras, the aim is not only to estimate relative positions of surveillance cameras with overlapping fields of view, but also to characterise the motion of targets between non-overlapping pairs of cameras. Although in principle the activity topology could be derived manually for small sets of cameras, this approach clearly does not scale to large network surveillance systems, where individual cameras may frequently be added, malfunction or moved.

There have been a number of approaches in the prior art that attempt to estimate the activity topology of a network of cameras. Typically, these approaches either require training data, such as the correspondence between paths or tracks in different images or camera views, to be supplied a priori or rely on observing the motion of targets for extended periods of time as they move through the area viewed by the network of cameras. This is in order to accumulate appearance and disappearance correlation information in an attempt to estimate the path that a target will take.

These methods all rely on either human intervention or observing and analysing large amounts of video data in order to determine the activity topology. This problem is complicated by the fact that comparisons must be made between every pair of cameras in a network. As the number of pairs of cameras grows with square of the number of cameras in the network, these techniques that are based on exhaustive pair wise comparisons of large volumes of data soon become infeasible.

Another class of methods estimate the calibration and orientation information relating each of the cameras in the network to a common frame of reference on the basis of commonly viewed features. These methods do not characterise the activity topology, are susceptible to failing to find the required number of common image features, and rely on large overlaps and complete connectivity between fields of view.

SUMMARY

In a first aspect the present invention accordingly provides a method for estimating the activity topology of a set of sensed data windows, each of the sensed data windows related to a corresponding sensed region, the method including the steps:

determining a subset of sensed data windows that are not connected; and excluding the subset of sensed data windows from the set of sensed data windows.

Preferably, the step of determining the subset of sensed data windows includes comparing sensed data windows pair wise from the set of sensed data windows.

Preferably, the step of comparing sensed data windows pair wise includes determining whether a pair of sensed data windows does not have overlapping sensed regions.

Preferably, the step of determining whether the pair of sensed data windows does not have overlapping sensed regions includes determining a first occupancy measure for a first sensed data window and a second occupancy measure for a second sensed data window, the first and second sensed data windows comprising the pair of sensed data windows, and comparing the first and second occupancy measures.

Preferably, the step of comparing the first and second occupancy measures includes forming an occupancy vector corresponding to a first sensed data window sequence associated with the first sensed data window and a second occupancy vector corresponding to a second sensed data window sequence associated with the second sensed data window and comparing corresponding elements of the first and second occupancy vectors.

Preferably, the step of comparing corresponding elements of the first and second occupancy vectors includes performing a vector exclusive-or operation on the first and second occupancy vectors to determine that the associated first and second sensed data windows do not overlap.

Preferably, the second occupancy vector that corresponds to the second sensed data window sequence is based on the second sensed data window and its nearest neighbouring sensed data windows thereby forming a padded occupancy vector.

Preferably, the step of comparing corresponding elements of the first and second occupancy vectors includes performing a vector exclusive-or operation on the first occupancy vector and the padded occupancy vector to determine that the associated first and second sensed data windows do not overlap.

Optionally, the step of comparing corresponding elements of the first and second occupancy vectors includes performing a vector uni-directional exclusive-or operation on the first occupancy vector and the padded occupancy vector to determine that the associated first and second sensed data windows do not overlap.

Preferably, the step of comparing corresponding elements of the first and second occupancy vectors includes comparing over neighbouring elements of one or both of the first and second occupancy vectors.

Preferably, the step of determining whether a pair of sensed data windows does not have overlapping sensed regions includes taking into account the likelihood of a false indication that a pair of sensed data windows do overlap.

Preferably, the step of taking into account the likelihood of a false indication that a pair of sensed data windows do overlap is based on previous data associated with the pair of sensed data windows.

Preferably, the step of taking into account the likelihood of a false indication that a pair of sensed data windows do overlap includes taking into account an error rate of a sensor or sensors associated with the pair of sensed data windows.

Preferably, the sensed data window is an image window and the first and second sensed data window sequences correspond to first and second image window sequences.

Preferably, the first and second image window sequences correspond to respective time series of images.

Preferably, the time series of images is provided by cameras in a network surveillance system.

Preferably, the method further includes the step of determining a further subset of sensor data windows that are connected.

In a second aspect the present invention accordingly provides a network surveillance system including:
  a network of sensors, each sensor providing one or more sensed data windows each corresponding to a sensed region and forming in total a set of sensed data windows; and
  data processing means to determine a subset of sensed data windows that are not connected and excluding the subset of sensed data windows from the set of sensed data windows.

In a third aspect the present invention accordingly provides a program storage device readable by machine, tangibly embodying a program of instructions to perform method steps for estimating the activity topology of a set of sensed data windows, each of the sensed data windows related to a corresponding sensed region, the method steps including:
  determining a subset of sensed data windows that are not connected; and
  excluding the subset of sensed data windows from the set of sensed data windows.

In a fourth aspect the present invention accordingly provides a method for estimating the location of a sensor in a network of sensors monitoring an area, the method including the steps of:
  dividing subsets of sensors into respective zones each viewing a corresponding region; and
  determining those zones where the sensor does not have an overlapping view of the corresponding region viewed by the zone.

BRIEF DESCRIPTION OF THE DRAWINGS

Embodiments of the present invention will be discussed with reference to the accompanying drawings wherein.

In the following description, like reference characters designate like or corresponding parts throughout the several views of the drawings.

TECHNICAL DESCRIPTION

Figure 1:
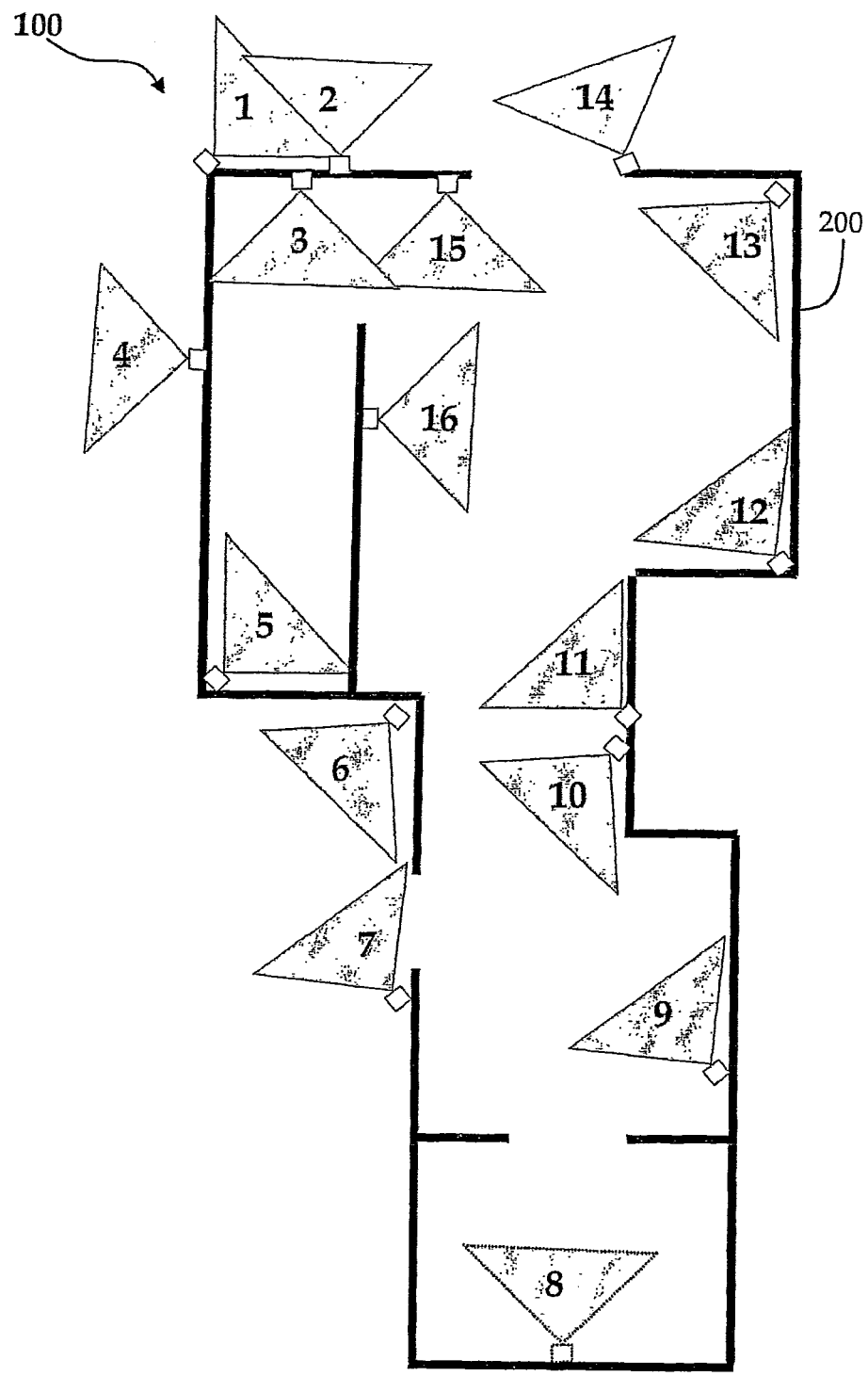
FIG. 1 is a schematic view of a network surveillance system including a network of cameras distributed about a building.

Referring now to FIG. 1, there is shown a schematic diagram of a network surveillance system 100 being distributed about a building 200 for the monitoring of an extended area both inside and outside of the building. In this illustrative embodiment, network surveillance system 100 includes a network of cameras comprising sixteen (16) individual IP cameras 1, 2 . . . 16 that convey their images in real time to a centralised monitoring site. Each camera has a corresponding field of view which is shown figuratively as a shaded area extending from the camera location.

Whilst the network surveillance system 100 depicted here includes cameras having substantially similar characteristics, clearly the invention may also equally be applied to camera or sensor networks that include many different types of cameras or sensors having a wide range of resolutions and other imaging characteristics. As depicted in FIG. 1, many of the fields of view of the individual cameras will overlap due to their positioning. This variation in positioning not only includes physical location about building 200 but also their height and orientation. As would be apparent to those skilled in the art, the indicative shaded area does not show the true extent of the field of view which will depend on the optical setup of the individual camera.

Whilst in this illustrative embodiment, the EP cameras have been optimised for detecting information in the visible range of wavelengths, it would be apparent to those skilled in the art that the present invention is also applicable to any electromagnetic imaging device, image capture means or sensor device which produces a sensed data window that relates to a corresponding sensed region. This includes, but is not limited to thermal imaging cameras, X-ray cameras and other systems such as audio or sonar mapping systems. In addition, each individual camera may include a standard analogue camera in combination with a frame grabber device to provide digital image data. Furthermore, the camera may comprise a sensor that is only capable of detecting the presence of a target within an area thereby producing only a single "pixel" of information such as an audio, chemical, thermal or motion sensor or the like.

Figure 2:
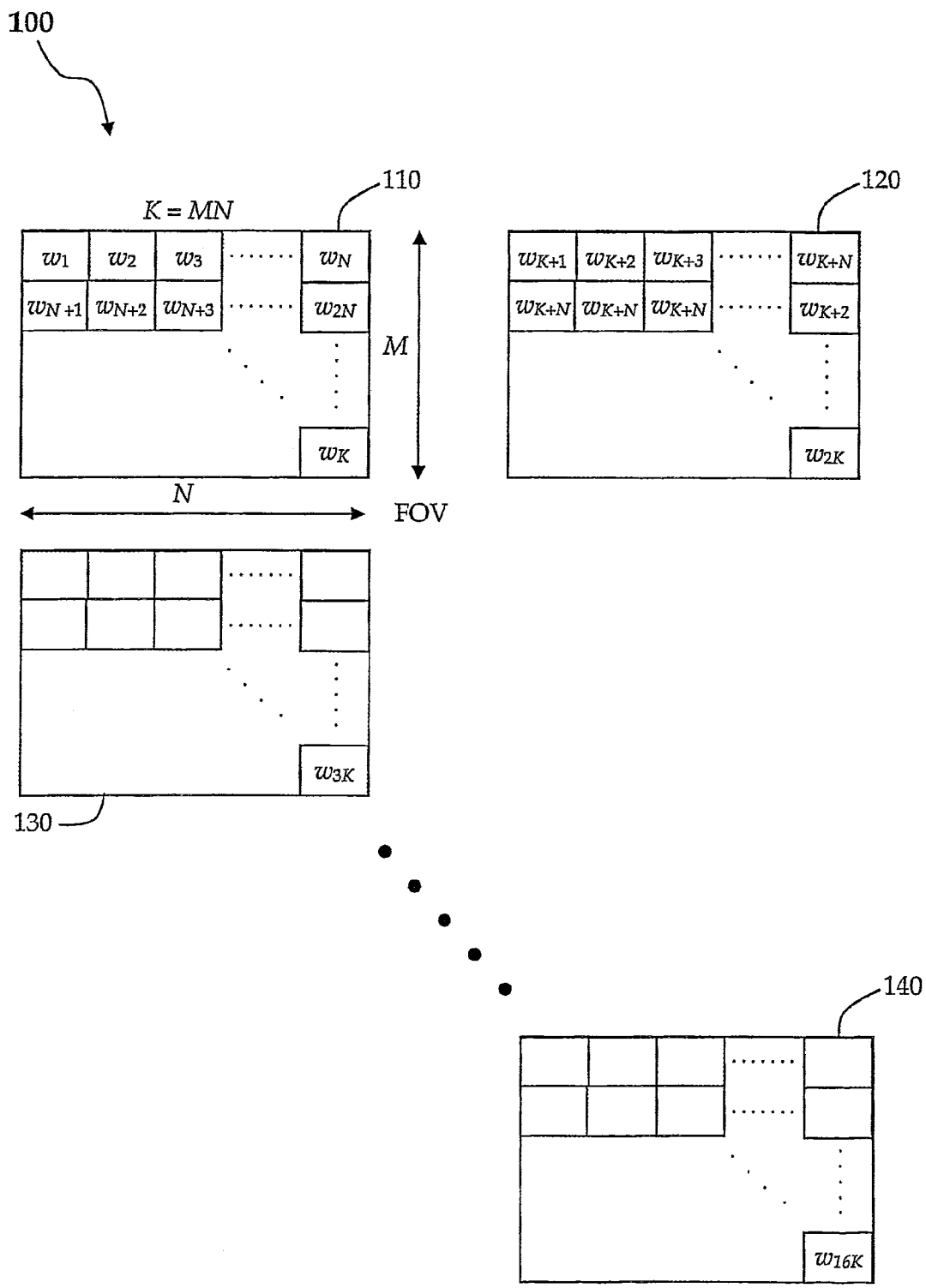
FIG. 2 is a schematic view of camera images corresponding to the network of cameras illustrated in FIG. 1 depicting how the camera images are divided into a set of image windows.

Referring now to FIG. 2, there is shown a schematic view of the camera images 110, 120, 130, . . . , 140 that correspond to the 16 cameras illustrated in FIG. 1. Each camera image is then further divided into K image windows $w_i$ comprising M rows of N image windows in each row. In this illustrative embodiment, each of the cameras includes an equal number of image windows however; equally different cameras may have different sized image windows or only one image window where the entire camera image is taken to be a window. Furthermore, each image may be divided into image windows of varying size which do not necessarily have to be of rectangular shape but may have a curved boundary such as would be readily described by a spline function or the like.

In this manner, network surveillance system 100 may be treated as an equivalent set of image or sensed data windows $W=\{w_1 \ldots w_{16K}\}$ where each of the image windows relate to a corresponding view of an area or sensed region. Clearly, a number of image windows will have overlapping views of the area as can readily be seen by inspection of FIG. 1. As network surveillance system 100 is providing images in real time, there will be an image window sequence for each image window corresponding to the time series of images provided by the camera. Whilst in this illustrative embodiment, the image window sequence is provided in real time, equally the image window sequence can be based on stored camera or sensor image information which may be recalled and analysed.

Figure 3:
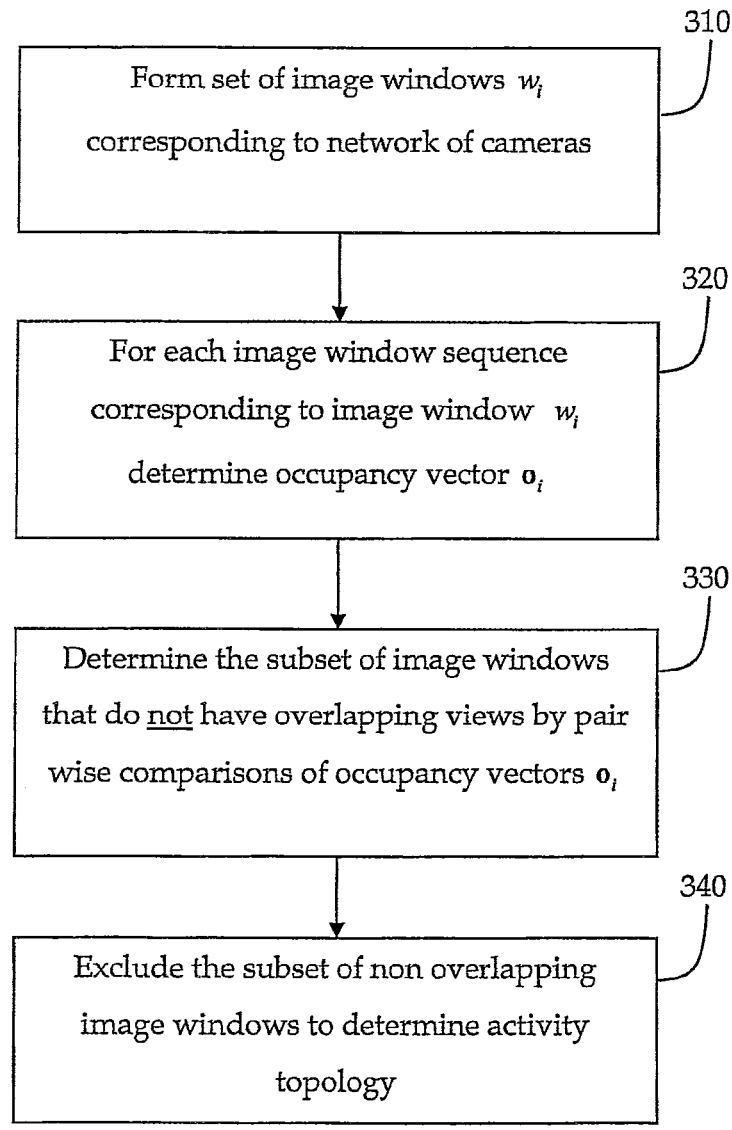
FIG. 3 is a flowchart of a method for determining the activity topology according to a first illustrative embodiment of the present invention.

Referring now to FIG. 3, there is shown a flowchart depicting a method for determining the activity topology of network surveillance system 100 or equivalently the set of image windows W in accordance with a first illustrative embodiment of the present invention. At step 310, from the images of cameras 1 to 16, the set of image windows are formed as depicted in FIG. 2. As stated previously, each image window will have an associated image window sequence formed by the time series of the individual images provided by the cameras.

At step 320, for each window $w_i$ over the set of image windows W, the occupancy of each image window is determined as a function of time t. In this example, assume t runs from 0 to some maximum time T. In this first illustrative embodiment, an occupancy vector $o_i=(o_{i1}, \ldots, o_{iT})$ is formed corresponding to the image sequence of each image window $w_i$ with $o_{it}$ set to 1 if window $w_i$ is occupied at time t, and 0 if not. As would be apparent to those of ordinary skill in the art, if two image windows view exactly the same scene then their corresponding occupancy vectors over time T will be substantially identical.

In this first illustrative embodiment, image window $w_i$ is defined to be occupied when a person's lowest visible extent falls within the boundaries of that window. A person's lowest visible extent may be their point of contact with the ground, or the point at which the lower portion of their body becomes occluded. As a person moves around building 200, as monitored by cameras 1 to 16, their lowest visible extent will move from one camera to another and hence from image window to image window.

As would be apparent to those skilled in the art, an occupancy measure can be defined in a number of different ways depending on the object being tracked through the network and the particular nature of the cameras and sensors that are deployed. Some other examples of determining when an image window is occupied include identifying when the image of a boat or vehicle enters the specified image window, the detection of a sonar or radar response which indicates the presence of an object in a particular location, or the activation of a passive infra-red, light beam, weight, chemical, audio or capacitance sensor.

At step 330, the subset of image windows $\hat{W}$ that do not have overlapping views is determined based on the process of carrying out pair wise comparisons between occupancy vectors $o_i$ to determine which windows are excluded or do not overlap. The exclusive-or operation a⊕b of two binary numbers a and b is defined to be 1 if and only if either a or b is 1 and the other is 0. This can be generalised to vector pairs $a=(a_1, \ldots, a_k)'$ and $b=(b_1, \ldots, b_k)'$ by defining the vector exclusive-or operator $$a \oplus b = \max_{i=1}^{k} a_i \oplus b_i$$

such that the exclusive-or of two vectors a and b is equal to 1 if a single pair wise comparison $a_i \oplus b_i$ is 1.

In accordance with the present invention, two windows $w_i$ and $w_j$ will be determined not to overlap or be connected if the exclusive-or $o_i \oplus o_j$ of the corresponding occupancy vectors $o_i$ and $o_j$ is 1. Thus the subset of non overlapping image windows $\hat{W}$ can be determined by parrying out pair wise comparisons via the exclusive-or operation. At step 340, the subset of image windows $\hat{W}$ is then excluded from the set of image windows W, thereby determining the activity topology.

In this embodiment, new occupancy information is generated with every new frame retrieved from cameras 1 to 16, which may occur as often as 30 times a second. Thus significant batches of occupancy information can be acquired in very short periods of time resulting in information about the activity topology being generated only after a short amount of time. This is in comparison to many prior art methods, especially those based on establishing correlations, which require the processing of large amounts of video in order to determine the activity topology. Accordingly, this method may also be applied in situations where only short segments of video are available. This may be the case, for instance, when a camera is moving from one location to another such as in the case of a pan-tilt-zoom camera.

As would be appreciated by those skilled in the art, the vector exclusive-or comparison requires very little time to calculate even for long vectors. Furthermore, as stated above the occupancy vectors on which it is based do not need to be collected over long periods, but rather only as long as is necessary to eliminate obviously non-overlapping windows. This is thus an extremely efficient means of eliminating image windows which are not connected or do not overlap and hence determining the activity topology of a network of cameras.

Whilst this illustrative embodiment has been directed to image windows, equally the present invention may be directed to any sensed data window which corresponds to a sensed region. In one embodiment, the set of sensed data windows may relate to a set of audio detectors distributed throughout building 200 in a similar manner to the cameras already depicted (see FIG. 1). These audio sensors may produce a sound mapping of a corresponding sensed region comprising one or more sensed data windows or a single sensed data window that effectively also functions as an occupancy measure.

Figure 4:
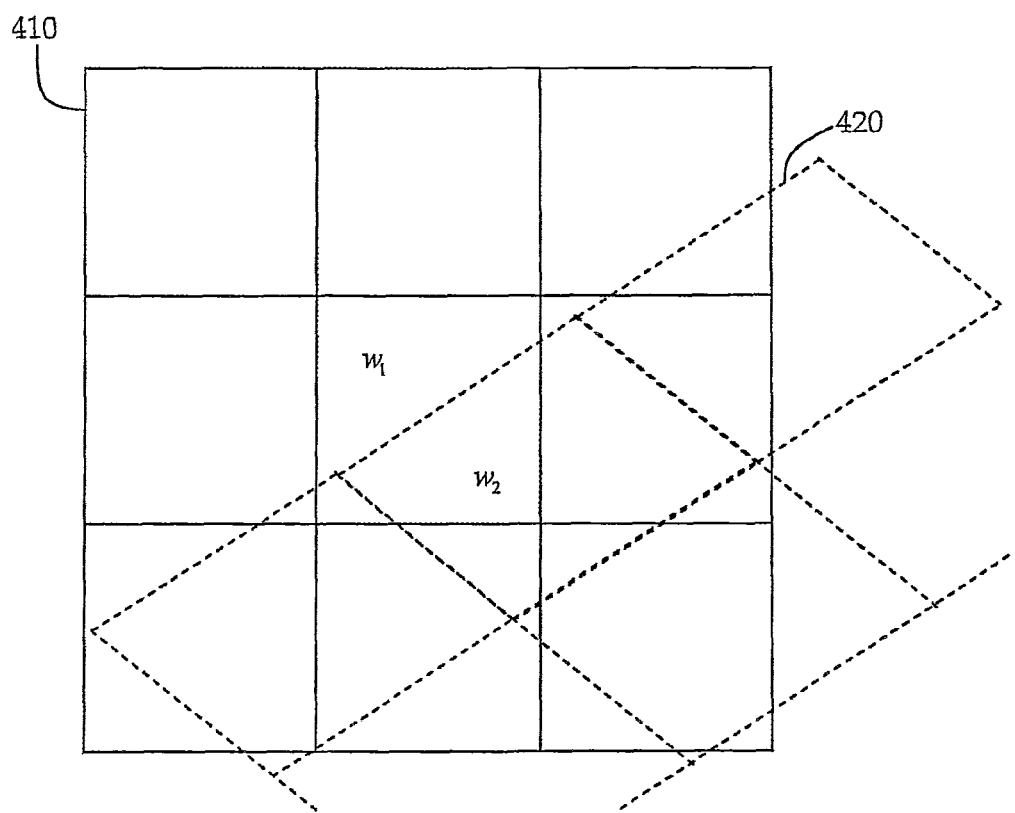
FIG. 4 is a figurative view showing the overlap of two camera images corresponding to cameras having different orientations when viewing a common region of interest.

In another illustrative embodiment of the present invention, the robustness of the determination of overlap may be improved by introducing a padded occupancy vector $p_i$ which is designed to take into account the situation depicted in FIG. 4, where it is possible due to the orientation of the cameras that overlapping windows from each camera view 410, 420 may simultaneously be occupied and vacant such as $w_1$ and $w_2$. In this example, camera image 410 is assumed to be a front on view to the region of interest whereas the camera image 420 corresponds to a skewed downwards view which introduces a relative distortion in window $w_2$ when compared to $w_1$. Of course a similar effect will occur if two cameras are offset from one another. In this camera setup, the exclusive-or of the corresponding occupancy vectors could indicate that windows $w_1$ and $w_2$ do not overlap when in fact they partially overlap.

To address this potential issue, a padded occupancy vector $p_i$ is defined that includes the immediately surrounding neighbours of a given window $w_i$. In this manner, $p_i$ is defined to have element $p_{it}$ set to 1 when window $w_i$ or any of its immediately surrounding neighbours is occupied at time t. In this embodiment, a uni-directional version of the exclusive-or is defined such that $a \ominus b$ is 1 only if a is 1 and b is 0. Similarly, the corresponding vector uni-directional exclusive-or operator for two vectors a and b is defined as:

$$a \ominus b = \max_{i=1}^{k} a_i \ominus b_i.$$

Accordingly, in this embodiment the method for determining whether two image windows $w_i$ and $w_j$ overlap is based on calculating $o_i \ominus p_j$ i.e. on the basis of the occupancy vector $o_i$ and the padded occupancy vector $p_j$. As would be apparent to those skilled in the art, use of the padded occupancy vector will accommodate occupancy misalignments in the spatial domain.

Similarly, to accommodate for potential errors in time synchronisation between two cameras a similar technique can be carried out in the time domain, whereby an element of either an occupancy vector or a padded occupancy vector is set to 1 at a time when the image window or its immediately surrounding neighbours is occupied for a window of time surrounding t. The size of this time window can then be varied according to expected time or synchronisation mismatch between cameras.

The process of padding the occupancy vector through time also allows the activity topology of image windows which do not have views of the same area to be determined. Two image windows which do have views of the same region will observe occupancy at the same times and thus not generate an exclusion. These windows, having observed traffic and not having been excluded, may be said to overlap or be connected. This overlap is measured for a time offset of zero, meaning that the images in which occupancy is measured in both windows were taken at approximately the same time.

The process of measuring overlap may be repeated, however, for various time offsets between cameras. This requires that the occupancy statistics for one image window of a pair are delayed by a certain time period. Windows which overlap given a particular time offset indicate the paths that targets take through the fields of view of the cameras. A target moving from a first image window at time t=0 to a second image window at time t=1 will generate corresponding occupancy statistics. These statistics will align, and therefore not generate an exclusion, if the elements of the occupancy vector corresponding to the second image window are moved one time step into the past.

Offsetting the occupancy vector corresponding to second image window in time thus allows the exclusion process to be used to identify the motion of targets from one window to another. Overlap thus indicates a connection between windows which is broader than a physical correspondence between parts of the scene viewed.

In this manner, overlap when time offsets are considered will also indicate the paths taken and provide further information for estimating the activity topology of the network of cameras. The connections between windows become less direct as the time offset increases, and this must be taken into account in the estimation process. The process of determining overlap is otherwise unaffected.

The measure $o_i \ominus p_j$ is not symmetric so it is possible that $o_i \ominus p_j$ does not equal $o_j \ominus p_i$, reflecting the conservative nature of this padding process. A response to the asymmetry of the measure might be to require that both $o_i \ominus p_j$ and $o_j \ominus p_i$ in order to identify the image windows as excluded before a conclusion is drawn. This approach is, however, only suitable for situations in which it is expected that every window over the entire camera network will exhibit the occupancy necessary to calculate exclusion. In most practical camera networks, it is likely that some windows will be in a position whereby they will never be occupied.

If it is accepted that a window pair do not overlap if either $o_i \ominus p_j$ or $o_j \ominus p_i$ identify an exclusion or instance of non-overlap, then every window in the network may be processed. It is still not possible to process every possible pair of image windows, but the overlap of every image window which may be occupied with every other image window in the network may be calculated.

In another illustrative embodiment of the present invention, a probabilistic approach is employed to determine whether a pair of image windows indeed overlap or are connected that is based on a number of measurements or previous data as opposed to a single contradiction. This approach takes into account that there may be an inherent error rate associated with the occupancy measure or detection process employed in the surveillance system that could potentially result in image window pairs being classified incorrectly as overlapping or unconnected.

As has been described previously, the observation data will consist of the set of measured occupancies and corresponding exclusion events. For an image window pair that has seen a number of occupancies but few exclusions then it is likely that they do in fact overlap. Similarly, for a pair of image windows where the majority of occupancies have resulted in associated exclusions then it is unlikely that the image windows do overlap. In this further embodiment, a hypothesis of image window overlap is tested based on calculating the likelihood ratio.

In accordance with this probabilistic approach, the following events are defined at time t:
A: $p_{jt}=0$
B: $o_{it}=1$
V: image windows $w_i$ and $w_j$ overlap
$\overline{V}$: image age windows $w_i$ and $w_j$ do not overlap As such, events A and B together define a contradiction as stated previously. Initially, the likelihood of a single contradiction is computed, given the binary hypotheses V and $\overline{V}$, in order to determine the likelihood ratio $$\frac{Pr(AB \mid V)}{Pr(AB \mid \overline{V})}.$$

First compute the likelihood of a contradiction occurring if the windows overlap. This can be written as:

$$Pr(AB \mid V) = Pr(A \mid BV)Pr(B \mid V).$$

Assuming that both camera fields of view are of approximately the same scale, then the image window $w_i$ is completely covered by the neighborhood of $w_j$ if image windows $w_i$ and $w_j$ overlap. Therefore the probability $Pr(A \mid BV)$ will be governed by a tracking error rate (the rate of missed detections of occupancy) which is defined as C. When an occupancy event is missed by the detection process it is still possible that $p_{jt}=1$ because other detections may have filled the gap.

This eventuality is compensated for by multiplying the tracking error rate C by an estimate of the probability that $p_{jt}$ would be 0 if the detection failed. Therefore the probability is given by $$Pr(A \mid BV) = C \times \frac{\text{count}(p_j = 0)}{T}$$

where T is the total number of observations (which is the length of $p_j$). The other term in the likelihood is then computed as $$Pr(B \mid V) = \frac{\text{count}(o_i = 1)}{T}$$

To compute $Pr(AB \mid \overline{V}) = Pr(A \mid B\overline{V})Pr(B \mid \overline{V})$ it is first noted that if image windows do not overlap, A and B are independent. Therefore $$Pr(A \mid B\overline{V}) = Pr(A) = \frac{\text{count}(p_j = 0)}{T}$$

and, as $Pr(B \mid V) = Pr(B \mid \overline{V})$, the likelihood ratio will be given by $$\frac{Pr(AB \mid V)}{Pr(AB \mid \overline{V})} = \frac{Pr(A \mid BV)}{Pr(A \mid B\overline{V})} = C$$

Thus, the plausibility of the hypothesis that the image windows in fact overlap is multiplied by C, the tracking error rate (which is expected to be very low), for each contradiction that occurs. This implies that the overall probability of a pair of windows overlapping will be given by $C^K$, where K is the number of contradictory observations. This can be calculated by defining operator ⊘ such that, for two vectors a and b of length k, the operator returns K, i.e.

$$a \oslash b = \sum_{i=1}^{k} a_i \ominus b_i.$$

In most general applications, error rates up to 5% can be expected and in these cases, employment of the probabilistic exclusion measure will improve the determination of the activity topology. In cases where the error rate is higher, it may become necessary to observe more traffic before drawing conclusions regarding overlap between pairs of image windows.

In a further embodiment, this probabilistic approach to determining the activity topology is extended to deal with data generated over longer periods of time. A modification in notation is employed in order to describe this further embodiment.

For each image window $w_I$ there is defined to be an associated random variable $O_i^t$ which represents its (a-priori unknown) occupancy at time t. If it is determined that window $w_i$ is occupied at time t then define $O_i^t=1$, which is represented by the proposition $o_i^t$. For $w_I$ unoccupied at time t, then $O_i^t=0$ and this is represented by the proposition $\overline{o}_i^t$.

A padded version of $O_i^t$, labelled $P_i^t$ is defined similarly, and the proposition that $P_i^t=1$ represented as $p_i^t$. As has been described previously, the measured occupancy of an image window $w_i$, provides an indication as to the presence or absence of a target within the corresponding sensed region. Typically, this does not relate to a specific target as such but rather a determination that the image window is occupied. In this notation, the presence of a target or the fact that a window is occupied is indicated by the proposition that the random variable $F_i^t=1$, which is represented as $f_i^t$.

For each pair of windows $w_i$ and $w_j$ a random variable $V_{ij}$ is associated, with the proposition that the windows do in fact overlap or are connected represented by setting $V_{ij}=1$, this in turn being represented by the notation $v_{ij}$ and the alternative that the windows do not overlap by $\overline{v}_{ij}$.

Once again to assess the evidence for and against the proposition that a pair of windows overlap a likelihood ratio approach is employed. As described previously, the likelihood ratio has the advantage that it provides a measure of the certainty which may be ascribed to a pair of contradicting hypotheses such as in this case the propositions that the windows $w_i$ and $w_j$ do, or do not, overlap given the observed data.

In this illustrative embodiment, the likelihood ratio L for the propositions that windows $w_i$ and $w_j$ do overlap ($v_{ij}$), and that they don't ($\overline{v}_{ij}$), is given by $$L = \frac{P(x_{ij}^{N/T} \mid v_{ij})}{P(x_{ij}^{N/T} \mid \overline{v}_{ij})}. \tag{1}$$

where N represents the number of exclusions and T represents the number of opportunities and $x_{ij}^{N/T}$ represents the number of exclusions measured and the number of times that an exclusion could have been measured between windows $w_i$ and $w_j$, but wasn't.

Both the numerator and denominator in equation (1) may be represented as binomial distributions as they result from the repeated selection between two possibilities ($x_{ij}$ and $\overline{x}_{ij}$) implying that $$P(x_{ij}^{N/T} \mid V_{ij}) = \binom{N}{T} P(x_{ij} \mid V_{ij})^N P(\overline{x}_{ij} \mid V_{ij})^{T-N} \tag{2 \& 3}$$

$$= \binom{N}{T} P(x_{ij} \mid V_{ij})^N (1 - P(x_{ij} \mid V_{ij}))^{T-N}.$$

Accordingly, determining the probabilities $\mathcal{P}(x_{ij} \mid v_{ij})$ and $\mathcal{P}(x_{ij} \mid \overline{v}_{ij})$, are important in interpreting the exclusion results. An exclusion is recorded between windows $w_i$ and $w_j$ when both $o_i$ and $\bar{p}_j$ hold simultaneously. The probability of an exclusion is therefore defined as $$\mathcal{P}(x_{ij}) = \mathcal{P}(o_i \bar{p}_j). \quad (4)$$

If it is assumed that there is no overlap between windows $w_i$ and $w_j$, then $O_I$ and $P_j$ are independent events and accordingly $$\mathcal{P}(x_{ij}|\bar{v}_{ij}) = \mathcal{P}(o_i)\mathcal{P}(\bar{p}_j) \quad (5)$$

where $\mathcal{P}(O_I)$ and $\mathcal{P}(P_j)$ are calculated by counting occupancies.

If windows $w_i$ and $w_j$ overlap, the random variables $O_i$ and $P_j$ will not be independent but they are conditionally independent given $F_i$ as the only interaction between the two random variables will be through the presence or absence of a target in the sensed region corresponding to image window $w_i$.

If the two windows are within the sensed region of the same camera or detector, it could be possible that the occupancy determination process used to measure $O_i$ and $P_j$ could interact, but this is unlikely and in any case image windows within the same camera would not be compared in practice due to there being more effective methods to determine the relationship between these image window pairs.

The following considers the case in which windows $w_i$ and $w_j$ overlap. The fact that $O_i$ and $P_j$ are conditionally independent given $F_i$ implies that $$\mathcal{P}(x_{ij}|v_{ij}) = \mathcal{P}(o_i|F_i)\mathcal{P}(\bar{p}_j|F_i) \quad (6)$$

As there are only two possible values for $F_i$, these can be dealt with explicitly resulting in the following expression $$\mathcal{P}(x_{ij}|v_{ij}) = \frac{\mathcal{P}(o_i|f_i)\mathcal{P}(\bar{p}_j|f_i)\mathcal{P}(f_i) + \mathcal{P}(o_i|\bar{f}_i)\mathcal{P}(\bar{p}_j|\bar{f}_i)}{\mathcal{P}(f_i)} \quad (7)$$

The term $\mathcal{P}(o_i|f_i)$ represents the probability with which the occupancy determination process can be expected to correctly identify the presence of a target in the image window $w_i$ (i.e. that the sensed region is actually occupied). This is the true positive rate for the occupancy determination process.

The term $\mathcal{P}(o_i|\bar{f}_i)$ represents the probability with which occupancy will be detected in window $w_i$ when the corresponding sensed region does not contain a target (i.e. the sensed region is not actually occupied). This is the false positive rate for the occupancy determination process.

The probabilities relating the padded occupancy of window $w_j$ to $F_i$, the presence or absence of a target in the scene volume corresponding to $w_i$, are somewhat more complex in form. This is due to the fact that although the two windows overlap they do not correspond to the same sensed regions. The fact that windows $w_i$ and $w_j$ overlap, however, implies that if there is a target within the sensed region corresponding to $w_i$ then it must necessarily fall within the domain of $p_j$. As has been described earlier, ensuring that this is the case is the purpose of the padding process. The overlap of windows $w_i$ and $w_j$ thereby guarantees that $$\mathcal{P}(p_j|f_i) \geq \mathcal{P}(o_i|f_i) \quad (8)$$

as it is known that there is at least one target present within the domain of $p_j$.

Equation (8), and the relationship that $\mathcal{P}(p_j) = 1 - \mathcal{P}(\bar{p}_j)$, implies that $$\mathcal{P}(\bar{p}_j|f_i) \leq \mathcal{P}(\bar{o}_i|f_i) \quad (9)$$

In practice the following expression is used for computation purposes $$\mathcal{P}(\bar{p}_j|f_i) = \mathcal{P}(\bar{o}_i|f_i) \quad (10)$$

this being the false negative rate. It would also be possible to collect occupancy frequencies by which to more accurately estimate this probability. The false negative rate should, however, be quite small, so any increase in accuracy would be marginal.

The set of windows which must be empty in order for $\bar{p}_j$ to hold includes the image window $w_j$ and its neighbours. If this set of n neighbours, defined as $N_j$, includes $w_j$ itself then $$P(\bar{p}_j | \bar{f}_i) = \prod_{k \in N_j} [P(\bar{o}_k | \bar{f}_k)P(\bar{f}_k | \bar{f}_i) + P(\bar{o}_k | f_k)P(f_k | \bar{f}_i)]. \quad (11)$$

The condition $\bar{f}_i$ guarantees that there are no targets in an overlapping region and furthermore that $\mathcal{P}(\bar{f}_k|\bar{f}_i) \geq \mathcal{P}(\bar{f}_k)$. So in practice the following relationship is assumed $$\mathcal{P}(\bar{p}_j|\bar{f}_i) = \mathcal{P}(\bar{o}_k|\bar{f}_k)^n \mathcal{P}(\bar{f}_k)^n \quad (12)$$

where $\mathcal{P}(\bar{o}_k|\bar{f}_k)$ is the true negative rate for the occupancy determination process and n is the size of $N_j$ the neighborhood of $w_j$ over which $p_j$ is calculated. The factors which make up the second term in the sum in equation 11 are both small in practice as they relate to the product of two small probabilities and hence are significantly smaller than the first term. The second term can thus be ignored for computational purposes.

The remaining terms $\mathcal{P}(f_i)$ and $\mathcal{P}(\bar{f}_i)$ from equation (7) then require evaluation. As $$\mathcal{P}(o_i) = \mathcal{P}(o_i|f_i)\mathcal{P}(f_i) + \mathcal{P}(o_i|\bar{f}_i)\mathcal{P}(\bar{f}_i) \quad (13)$$

where $\mathcal{P}(o_i|f_i)$ and $\mathcal{P}(o_i|\bar{f}_i)$ are the (known) true and false positive rates of the occupancy determination process and $\mathcal{P}(o_i)$ can be measured by counting. Given that $\mathcal{P}(\bar{f}_i) = 1 - \mathcal{P}(f_i)$ this relationship can then be substituted into equation (13) in order to determine $\mathcal{P}(f_i)$ and then $\mathcal{P}(\bar{f}_i)$.

Accordingly, in this illustrative embodiment a further refined estimate for the likelihood ratio L may be determined which provides a more accurate measure of how likely it is that two image windows overlap based on the following measured data:
  a count of the number of times each image window has been occupied;
  a count of the number of times each image window pair has been excluded;
  a count of the number of times each image window pair could possibly have been excluded;
  the true and false positive rate for occupancy detection; and
  the true and false negative rate for occupancy detection.

The approach exploits all the available occupancy information in identifying or eliminating the possibility of overlap or connectivity between image windows. This is accomplished by accurately modelling the factors involved in order to reach a conclusion that is well supported by the available evidence.

The calculation and incorporation of the likelihood ratio based on historical data takes into account detection errors in determining either occupancy or non occupancy of an image window at a given time by expressing a confidence level in the proposition that each pair of image windows do (or don't) indeed overlap. This confidence level may then be compared to a threshold value when determining whether to accept or reject a determined exclusion or overlap.

As would be appreciated by those skilled in the art, this approach can further improve the efficacy of estimating the activity topology of a set of image windows, especially in those systems where there is expected to be a significant error rate in the occupancy determination process.

Referring once again to FIG. 1, it can be seen that often cameras in a surveillance network such as network surveillance system 100 form natural clusters or zones. For example, in network surveillance system 100 building 200 can be seen to contain one or more cameras in each office, cameras monitoring corridors and public spaces, and cameras monitoring the building exterior. This grouping suggests a decomposition of the topology acquisition and tracking problem into a number of surveillance zones for this site. As an illustrative example, each room may be determined to be a zone with a number of overlapping cameras, as may a corridor, the set of cameras monitoring the lobby, and so on.

A zone will typically be defined by the feature that cameras within a zone have high transition frequency, and that transitions can take place in many ways, whereas transitions between zones are more tightly constrained. For example, as illustrated in FIG. 1, the only transition between an outdoor zone (e.g. cameras 1, 2 and 14) and a lobby zone (e.g. cameras 15, 13, 12, 11 and 16) may be through the front door of the building. Thus determining whether a given camera or image window is within a zone will greatly simplify the subsequent network tracking problem based on the activity topology for the network of cameras. This can be especially important where a malfunctioning camera is replaced or a new camera is added to the network.

In another illustrative embodiment of the present invention, this grouping of cameras or corresponding image windows into zones and performing pair wise comparisons with respect to the zones is provided. Advantageously, the form of the occupancy vectors allows them to be to be merged using a logical or operator allowing in one application a combined occupancy vector to be formed for a subset of image windows corresponding to a zone. The merged occupancy vector m is defined for a set of vectors $\{a_1 \ldots a_n\}$ as $$m(\{a_1 \ldots a_n\}) = \left[\bigcup_{i=1}^{n} a_{it}\right]_{i=1 \ldots T}.$$

Merging a set of occupancy vectors in this manner, results in a new vector that represents the total occupancy of all the image windows that correspond to the individual occupancy vectors. It is important to note that a merged occupancy vector of this type cannot be used for the same purposes as an occupancy vector representing a single image window. This is because a 1 in a merged occupancy vector does not imply occupancy of the entirety of the corresponding combined image window area. As an example of this, it is expected that the result of $m(\{a_1 \ldots a_n\}) \ominus a_1$ can be 1. However, the result of $a_1 \ominus m(\{a_1 \ldots a_n\})$ will always be 0.

Thus the merged occupancy vectors may be used as the second operand to the $\ominus$ operator when performing a pair wise comparison. The merged occupancy vectors may be based on the standard occupancy vector $o_i$ or preferably on the padded occupancy vector $p_i$ corresponding to $w_i$ where appropriate, such as where the situation illustrated in FIG. 4 arises. Accordingly, the overlap of a window $w_i$ with the subset of image windows $\{w_1 \ldots w_n\}$ which may faint a zone, can then be determined by calculating $o_i \ominus m(\{p_1 \ldots p_n\})$.

This process may readily be expressed as pseudo-code in the following manner:

```
OverlappingWindowSet = function HierarchicalOverlap(w , S)
    % w is a window within the added camera
    % S = {w₁,...,wₙ} is a set of windows (e.g zone) already existing
      within the system
    set o to be the occupancy vector for the window w
```

```
    % first the case in which there is a single window w₁ in S
    if n = 1 then
        set p to be the padded occupancy vector for the window w₁
        if not excluded(o , p) then
            OverlappingWindowSet = {w₁}
        endif
    endif
    % and recurse in the case where S contains more than one window
    OverlappingWindowSet = { }
    set m = n/3
    while S not empty
        set Sₘ to be the first m elements of S
        set m to be the union of the padded occupancy vectors for Sₘ
        if not excluded(o , m) then
            OverlappingWindowSet = OverlappingWindowSet +
               HierarchicalOverlap(w ,Sₘ)
        endif
        set S = S − Sₘ
    endwhile
return
```

By merging padded occupancy vectors within zones, this allows a hierarchical approach to be taken when adding new cameras or sensors to the activity topology. Existing cameras can be grouped arbitrarily, or by some criterion such as connectivity, and the corresponding occupancy vectors combined using the or process as described above. Each new camera can then be tested for exclusion against these groups by comparing its occupancy vector with that of the group. This allows the activity topology relating the camera to each one of the groups to be established. In the case where an activity topology relationship is detected, it may be further specified by hierarchically dividing the group into sub-groups and testing for exclusion with each. This process can be continued until a set of individual cameras is identified as overlapping with the newly added camera.

The present method has been tested on both simulated data and applied to actual camera data. In one application, synthetic data was generated so as to simulate a network of 50 cameras whose positions and orientations were randomly generated.

Additionally, the path of pedestrians or "targets" were randomly generated by an auto-regression process, thereby providing occupancy data. The important measure of the pedestrian activity in the network is the number of frames exhibiting occupancy.

In the testing that was carried out, 1,000 frames were generated for each camera with 1,255 window occupancies identified across the network over this period. The camera image corresponding to the field of view of each camera was divided into 100 image windows, giving a total of 5,000 image windows for the synthetic camera network. The testing carried out consisted of calculating the value of $o_i \ominus p_j$ for every pair of image windows $w_i$ and $w_j$. These calculations were carried out progressively at every 100 frames. This corresponded to less than 4 seconds of video at 30 frames per second, or 20 seconds of video at 5 frames per second. Over each interval the number of occupied windows was calculated, along with the number of exclusions.

Figure 5:
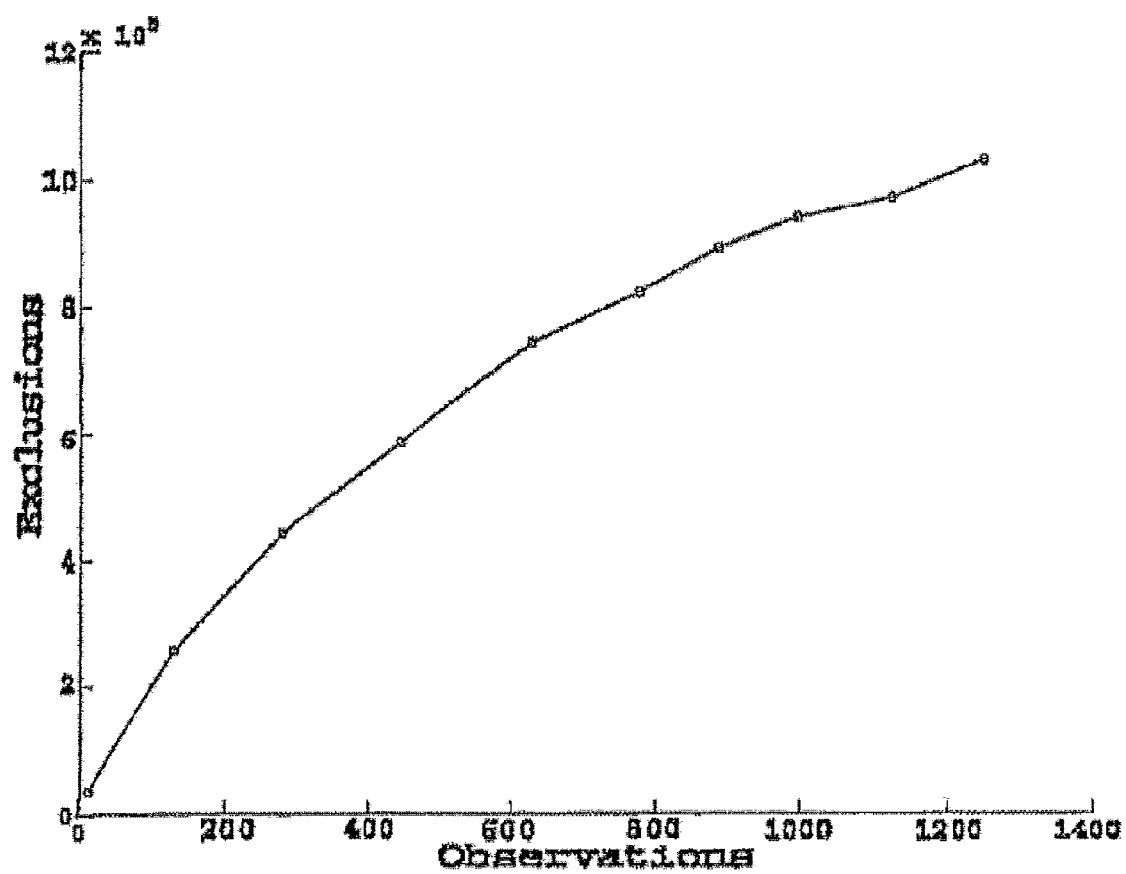
FIG. 5 is a plot of the number of exclusions versus the number of occupied image windows for a simulated network of cameras.

Referring now to FIG. 5, there is shown a graph of the number of exclusions determined versus the number of occupied windows for calculations made every 100 frames. The total number of exclusions for the simulated network is approximately $2.5 \times 10^7$. It can be seen that information about the activity topology of the network is gained very quickly with the rate of information gain slowing somewhat over time. These results were also checked by an algebraic analysis of overlap and it was found that each of the measured exclusions was in agreement with its analytic equivalent and none were found to be in error.

The method in accordance with the present invention was also applied to a network surveillance system including 4 partially overlapping cameras with 84 seconds of video recorded from each of the cameras. In this embodiment, each camera image was divided into 255 image windows, and 1,471 window occupancies were measured. The total number of windows for the network was 1,125, but only 156 of these were ever occupied over the course of the 84 seconds.

Once again the value of $o_i \ominus p_j$ for every pair of image windows $w_i$ and $w_j$ was calculated yielding a total of 252,105 exclusions that were calculated. The total number of pairs of windows was 1,265,625, but as the majority of the windows did not see traffic in this embodiment the number of exclusions would not be expected to approach this number. A sample of 20 randomly selected image windows was also manually checked to determine excluded areas and did not uncover any errors when compared to the calculated exclusions.

A brief consideration of the above described embodiments will indicate that the present invention provides an extremely effective approach to determining the activity topology for a set of sensed data windows which begins by assuming that all sensed data windows are potentially linked and then successively seeks to eliminate impossible connections rather than the slower process of building up positive evidence of activity. This is an easier decision to make, especially when a limited amount of data is available.

The present invention is also based on the realisation that it is impossible to prove a positive connection between cameras or sensors, as any correlation of events could be due to coincidence, whereas it is possible to prove a negative connection or non overlap by observing an object in one camera while not observing it at all in another. Over time, the true patterns of motion emerge as those which are not contradicted by the evidence. These patterns may then be used to initialise a finer level search using other approaches if required. Furthermore, the method does not rely on the accurate tracking of objects within each camera or sensor view. As such, this approach is readily scalable and furthermore is not reliant on accurate information related to the positioning, orientation and setup of individual cameras and/or sensors in the network.

It will be understood that the term "comprise" and any of its derivatives (eg. comprises, comprising) as used in this specification is to be taken to be inclusive of features to which it refers, and is not meant to exclude the presence of any additional features unless otherwise stated or implied.

Those of skill in the art would appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Furthermore, those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Although a number of embodiments of the method and system of the present invention have been described in the foregoing detailed description, it will be understood that the invention is not limited to the embodiment disclosed, but is capable of numerous rearrangements, modifications and substitutions without departing from the scope of the invention as set forth and defined by the following claims.

The claims defining the invention are as follows:

1. A method for estimating the activity topology of a set of sensed data windows in a networked system of sensors, each of the sensed data windows related to a corresponding sensed region associated with a given sensor, the method including the steps:
   determining a subset of sensed data windows having corresponding sensed regions that are not connected by comparing sensed data windows pair wise from the set of sensed data windows; and
   excluding the subset of sensed data windows that are not connected from the set of sensed data windows thereby eliminating these pairs of sensed data windows from the networked system of sensors and determining the active topology.

2. The method of claim 1, wherein the step of comparing sensed data windows pair wise includes determining whether a pair of sensed data windows does not have overlapping sensed regions.

3. The method of claim 2, wherein the step of determining whether the pair of sensed data windows does not have overlapping sensed regions includes determining a first occupancy measure for a first sensed data window and a second occupancy measure for a second sensed data window, the first and second sensed data windows comprising the pair of sensed data windows, and comparing the first and second occupancy measures.

4. The method of claim 2, wherein the step of determining whether a pair of sensed data windows does not have overlapping sensed regions includes taking into account the likelihood of a false indication that a pair of sensed data windows do overlap.

5. The method of claim 4, wherein the step of taking into account the likelihood of a false indication that a pair of sensed data windows do overlap is based on previous data associated with the pair of sensed data windows.

6. The method of claim 4, wherein the step of taking into account the likelihood of a false indication that a pair of sensed data windows do overlap includes taking into account an error rate of a sensor or sensors associated with the pair of sensed data windows.

7. The method of claim 5, wherein the step of taking into account the likelihood of a false indication that a pair of sensed data windows do overlap includes taking into account an error rate of a sensor or sensors associated with the pair of sensed data windows.

8. The method of claim 1, wherein the sensed data window is an image window.

9. The method of claim 8, wherein the image window is provided by a camera in a network surveillance system.

10. The method of claim 1, further including the step of determining a further subset of sensor data windows that are connected.

11. A network surveillance system including:
a network of sensors, each sensor providing one or more sensed data windows each corresponding to a sensed region and forming in total a set of sensed data windows; and
data processing means to determine a subset of sensed data windows having corresponding sensed regions that are not connected by comparing sensed data windows pair wise from the set of sensed data windows and exclude the subset of sensed data windows that are not connected from the set of sensed data windows thereby eliminating these pairs of sensed data windows from the network surveillance system and determining an active topology of a set of sensed data windows.

12. A non-transitory program storage device readable by machine, tangibly embodying a program of instructions to perform method steps for estimating the activity topology of a set of sensed data windows in a networked system of sensors, each of the sensed data windows related to a corresponding sensed region associated with a given sensor, the method steps including:
determining a subset of sensed data windows having corresponding sensed regions that are not connected by comparing sensed data windows pair wise from the set of sensed data windows; and
excluding the subset of sensed data windows that are not connected from the set of sensed data windows thereby eliminating these pairs of sensed data windows from the networked system of sensors and determining the active topology.

13. The network surveillance system of claim 12, wherein comparing sensed data windows pair wise includes determining whether a pair of sensed data windows does not have overlapping sensed regions.

14. The network surveillance system of claim 13, wherein determining whether the pair of sensed data windows does not have overlapping sensed regions includes determining a first occupancy measure for a first sensed data window and a second occupancy measure for a second sensed data window, the first and second sensed data windows comprising the pair of sensed data windows, and comparing the first and second occupancy measures.

15. The network surveillance system of claim 13, wherein determining whether a pair of sensed data windows does not have overlapping sensed regions includes taking into account the likelihood of a false indication that a pair of sensed data windows do overlap.

16. The network surveillance system of claim 15, wherein taking into account the likelihood of a false indication that a pair of sensed data windows do overlap is based on previous data associated with the pair of sensed data windows.

17. The network surveillance system of claim 15, wherein the step of taking into account the likelihood of a false indication that a pair of sensed data windows do overlap includes taking into account an error rate of a sensor or sensors associated with the pair of sensed data windows.

18. The network surveillance system of claim 16, wherein the step of taking into account the likelihood of a false indication that a pair of sensed data windows do overlap includes taking into account an error rate of a sensor or sensors associated with the pair of sensed data windows.

19. The network surveillance system of claim 11, wherein the network of sensors includes cameras, and wherein the sensed data window is an image window.

20. The network surveillance system of claim 11, wherein the data processor is operable to determine a further subset of sensor data windows that are connected.

* * * * *

UNITED STATES PATENT AND TRADEMARK OFFICE
CERTIFICATE OF CORRECTION

| | | |
|---|---|---|
| PATENT NO. | : 9,185,355 B2 | Page 1 of 1 |
| APPLICATION NO. | : 13/796271 | |
| DATED | : November 10, 2015 | |
| INVENTOR(S) | : Anton John van den Hengel et al. | |

It is certified that error appears in the above-identified patent and that said Letters Patent is hereby corrected as shown below:

On the Title Page, Column 1, Item (73) Assignee, Line 2, delete "Sourth" and insert -- South --

In the Claims

Column 17, Line 31, Claim 13, delete "claim 12," and insert -- claim 11, --

Signed and Sealed this
Fourteenth Day of June, 2016

Michelle K. Lee
*Director of the United States Patent and Trademark Office*